(12) United States Patent
Hall et al.

(10) Patent No.: US 6,410,933 B1
(45) Date of Patent: Jun. 25, 2002

(54) CR READER WITH INTEGRATED CONTROL MECHANISM

(75) Inventors: Douglas O. Hall, Canandaigua; David G. Sherburne, Ontario; Patrick M. Bruton, Palmyra, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/443,769

(22) Filed: Nov. 19, 1999

(51) Int. Cl.$^7$ ................................................. B65H 5/00
(52) U.S. Cl. ..................................................... 250/589
(58) Field of Search ................................ 250/588, 589, 250/378, 581, 591

(56) References Cited

U.S. PATENT DOCUMENTS

| | | | |
|---|---|---|---|
| 4,659,929 A | * 4/1987 | Fujiwara | 250/327.2 |
| 5,493,128 A | * 2/1996 | Boutet | 250/584 |
| 5,541,421 A | 7/1996 | Brandt et al. | |
| 5,861,631 A | 1/1999 | Wendlandt et al. | |
| 5,954,469 A | 9/1999 | Ngo et al. | |

* cited by examiner

Primary Examiner—Georgia Epps
Assistant Examiner—Mohammed Hasan
(74) Attorney, Agent, or Firm—William F. Noval

(57) ABSTRACT

A computed radiography (CR) reader comprising:

a cassette receiving station for receiving in a vertical orientation, a computed radiography cassette including a light tight cassette shell and an image plate supported by an extrusion closing of said shell, said image plate storing a latent radiographic image and being latched in said cassette shell;

a first roller assembly located on one side of said cassette receiving station;

a second roller assembly located on the other side of said cassette receiving station, cooperatively associated with said first roller assembly;

means for mounting said second roller assembly for movement towards and away from said first roller assembly;

an image plate unlatching and latching assembly; and a cam assembly operatively linked to said means for mounting said second roller assembly and to said unlatching and latching assembly, said cam assembly being operable in a first mode when a computed radiograhpy cassette is received in said cassette receiving station, to actuate said mounting means to move said second roller assembly towards said first roller assembly to clamp said cassette between said first and second roller assemblies and to actuate said unlatching and latching assembly to unlatch said image plate from said cassette shell;

and in a second mode to actuate said unlatching and latching assembly to latch said image plate in said cassette shell and to actuate said mounting means to move said second roller assembly away from said first roller assembly to unclamp said cassette to allow removal of said cassette from said receiving station.

9 Claims, 7 Drawing Sheets

CR READER WITH INTEGRATED CONTROL MECHANISM

FIELD OF THE INVENTION

This invention relates in general to computed radiography imaging systems and relates more particularly to a computed radiography imaging system in which exposed imaging plates are scanned while moved in a vertical direction and having a simplified and integrated control mechanism for positioning and clamping a cassette and for latching and unlatching an image plate from the cassette.

BACKGROUND OF THE INVENTION

Conventional film/screen radiography uses radiographic films which are not reusable. Computed radiography solves this problem by using reusable storage phosphor imaging plates, that can be exposed, read out, erased, and reused many times. Some computed radiography systems are flexible storage phosphor imaging plates which can be degraded through contact of the storage phosphor layer with plate handling rollers and the like. Another computed radiography system uses rigid storage phosphor imaging plates where plate handling mechanisms do not contact the storage phosphor layer. Although an improvement over systems using flexible imaging plates, the horizontal reading and erase path of such a system results in a computed radiography reader which is bulkier and slower than may be desirable. There is thus a need for a computed radiography system that is compact in size, has increased image plate throughput, and eliminate degradation of the storage phosphor due to the excessive handling.

There is also a need for a computed radiography reader having a simplified and integrated control mechanism for positioning and clamping a cassette and for latching and unlatching an image plate from the cassette.

SUMMARY OF THE INVENTION

According to a feature of the present invention there is provided:

A computed radiography (CR) reader comprising:
  a cassette receiving station for receiving in a vertical orientation, a computed radiography cassette including a light tight cassette shell and an image plate supported by an extrusion closing off said shell, said image plate storing a latent radiographic image and being latched in said cassette shell;
  a first roller assembly located on one side of said cassette receiving station;
  a second roller assembly located on the other side of said cassette receiving station, cooperatively associated with said first roller assembly;
  means for mounting said second roller assembly for movement towards and away from said first roller assembly;
  an image plate unlatching and latching assembly; and
  a cam assembly operatively linked to said means for mounting said second roller assembly and to said unlatching and latching assembly, said cam assembly being operable in a first mode when a computed radiography cassette is received in said cassette receiving station, to actuate said mounting means to move said second roller assembly towards said first roller assembly to clamp said cassette between said first and second roller assemblies and to actuate said unlatching and latching assembly to unlatch said image plate from said cassette shell; and in a second mode to actuate said unlatching and latching assembly to latch said image plate in said cassette shell and to actuate said mounting means to move said second roller assembly away from said first roller assembly to unclamp said cassette to allow removal of said cassette from said receiving station.

ADVANTAGEOUS EFFECT OF THE INVENTION

The invention has the following advantages.
1. The computed radiography system is compact in size.
2. The vertically oriented computed radiography system has increased image plate throughput compared to horizontally oriented systems.
3. Degradation of storage phosphor layer is minimized.
4. A simplified and integrated cam control mechanism positions and clamps a CR cassette as well as unlatching and latching an image plate from the cassette.

BRIEF DESCRIPTION OF THE DRAWINGS

FIG. 8 is a diagrammatic view of

DETAILED DESCRIPTION OF THE INVENTION

The invention has been described in detail with particular reference to certain preferred embodiments thereof, but it will be understood that variations and modifications can be effected within the spirit and scope of the invention.

Figure 9:
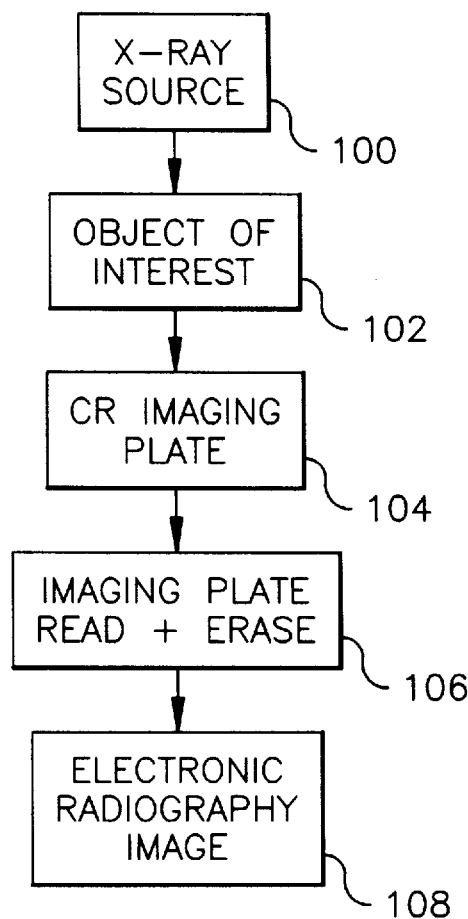
FIG. 9 is a block diagram of the computed radiography system including present invention.

Referring not to FIG. 9, there will be described a generic computed radiography system. In general, computed radiography utilizes the principle that exposure of the storage phosphor to a radiographic image produces a corresponding latent image in the storage phosphor. If the storage phosphor is raster scanned (e.g., by means of laser) with light of a first wavelength, the latent image will be emitted as a light image at a second wavelength. The light emitted image is converted into an electronic (digital) radiographic image which can be stored, processed, displayed, and used to produce a hardcopy (film, paper) radiographic image.

As shown in FIG. 9, x-ray source 100 irradiates object of interest 102 (such as a body part) to produce a radiographic image which exposes CR image plate 104. The latent radiographic image stored in plate 104 is read out by CR reader 106 which subsequently erases plate 104 so that it can be reused. The read out image is converted into an electronic radiographic image 108 by reader 106. The electronic (digital) radiographic 108 image can be processed to enhance the image, archived for later use, displayed on a display monitor, transmitted to a remote location and/or used to produce a hard copy print (film, paper).

Figure 1:
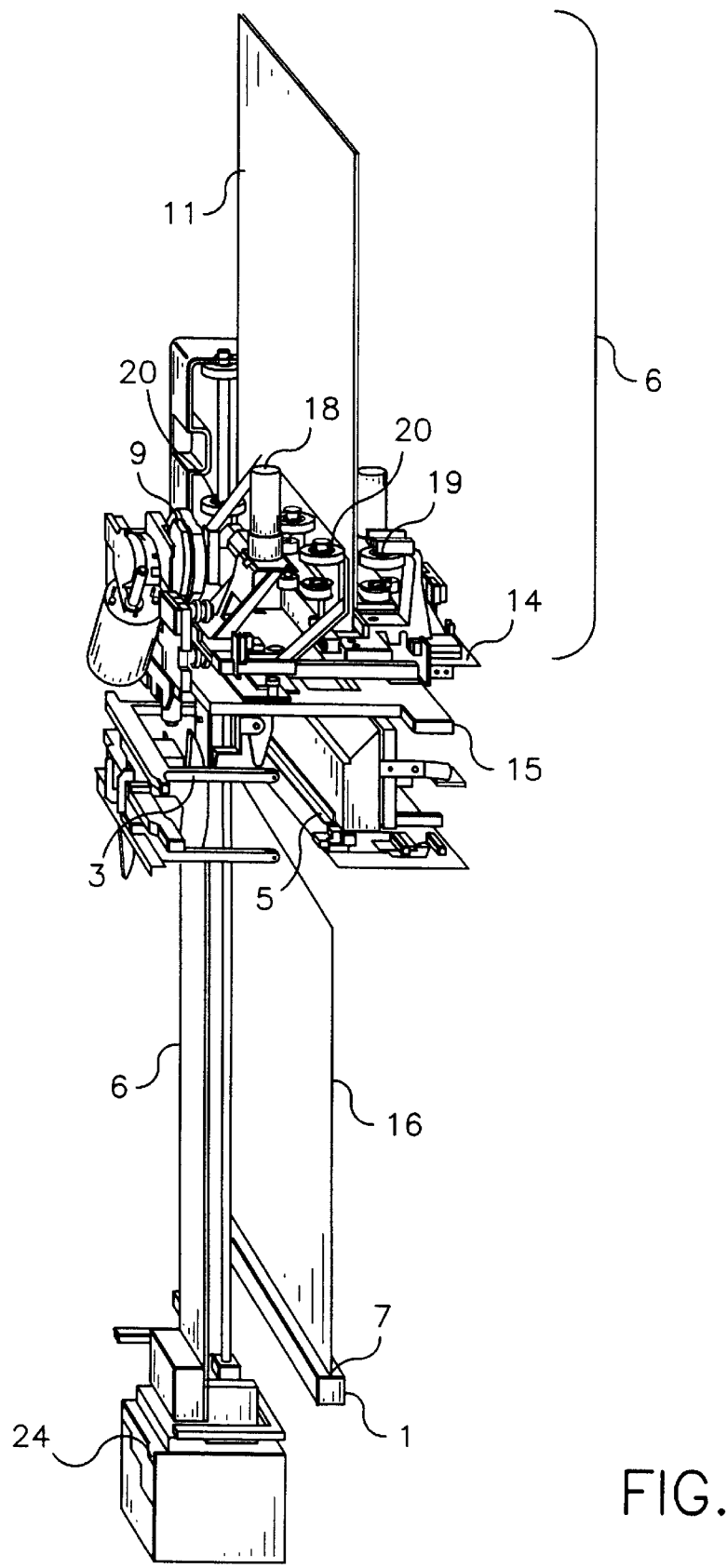
FIGS. 1 and 2 are perspective diagrammatic views taken from different directions of an embodiment of the present invention.
Figure 2:
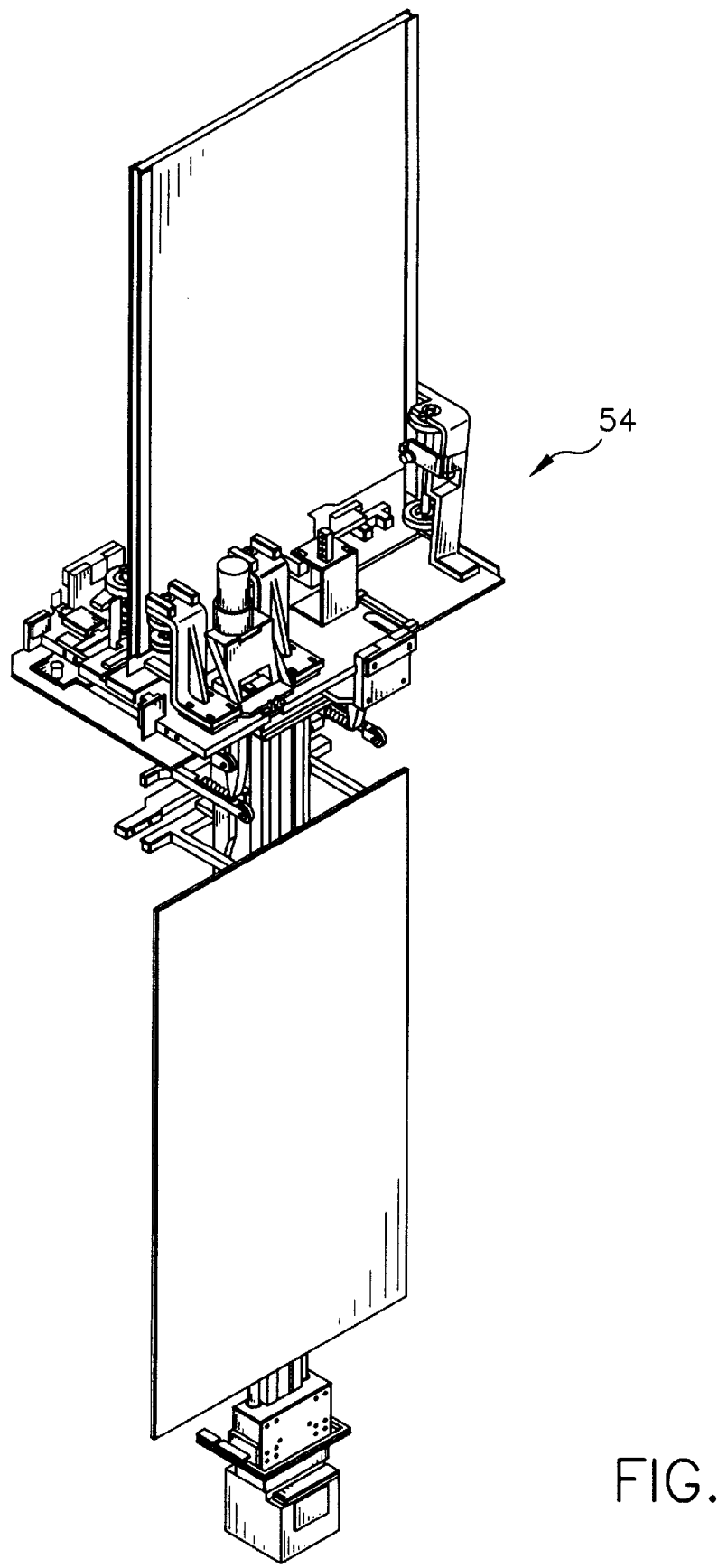
Figure 3:
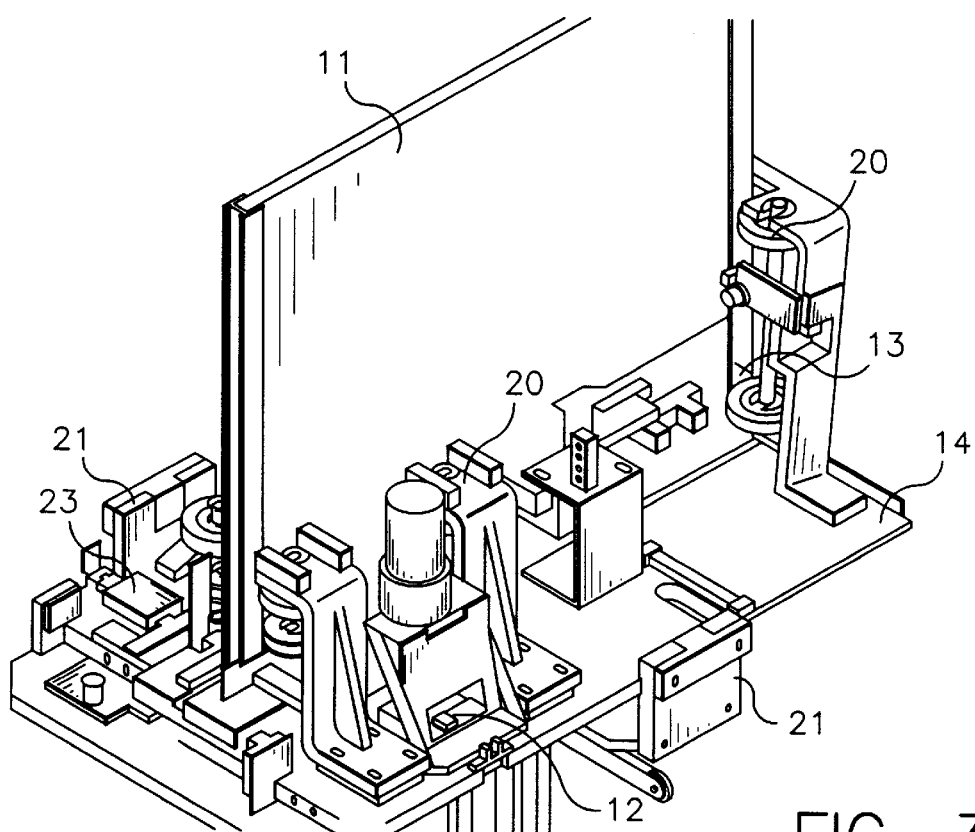
FIGS. 3–7 are perspective diagrammatic views of various components of the invention shown in FIGS. 1 and 2.
Figure 4:
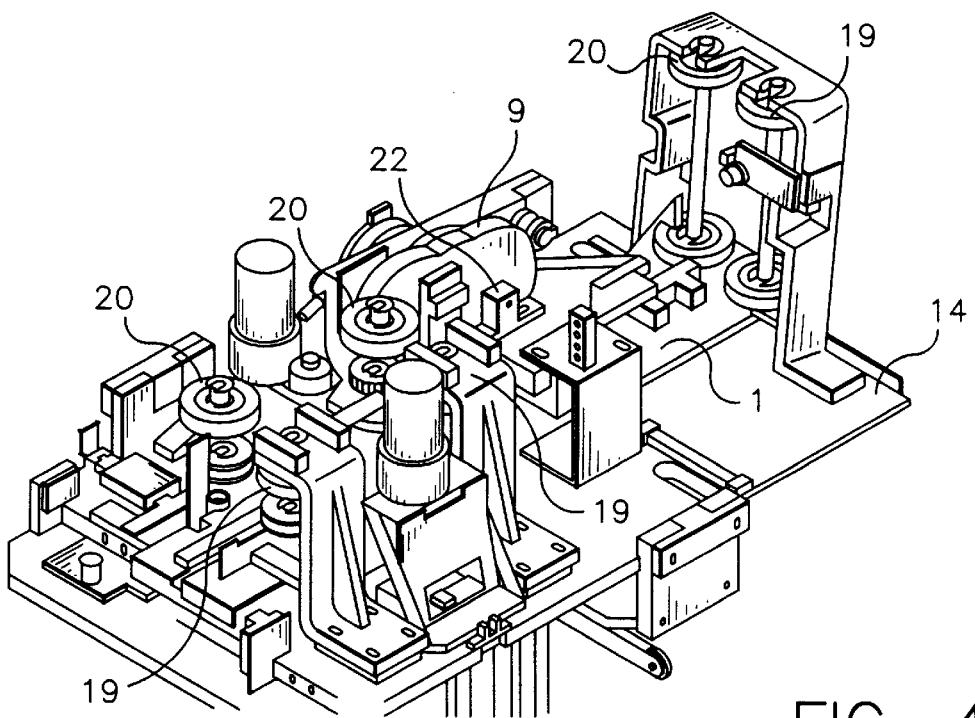
Figure 7:
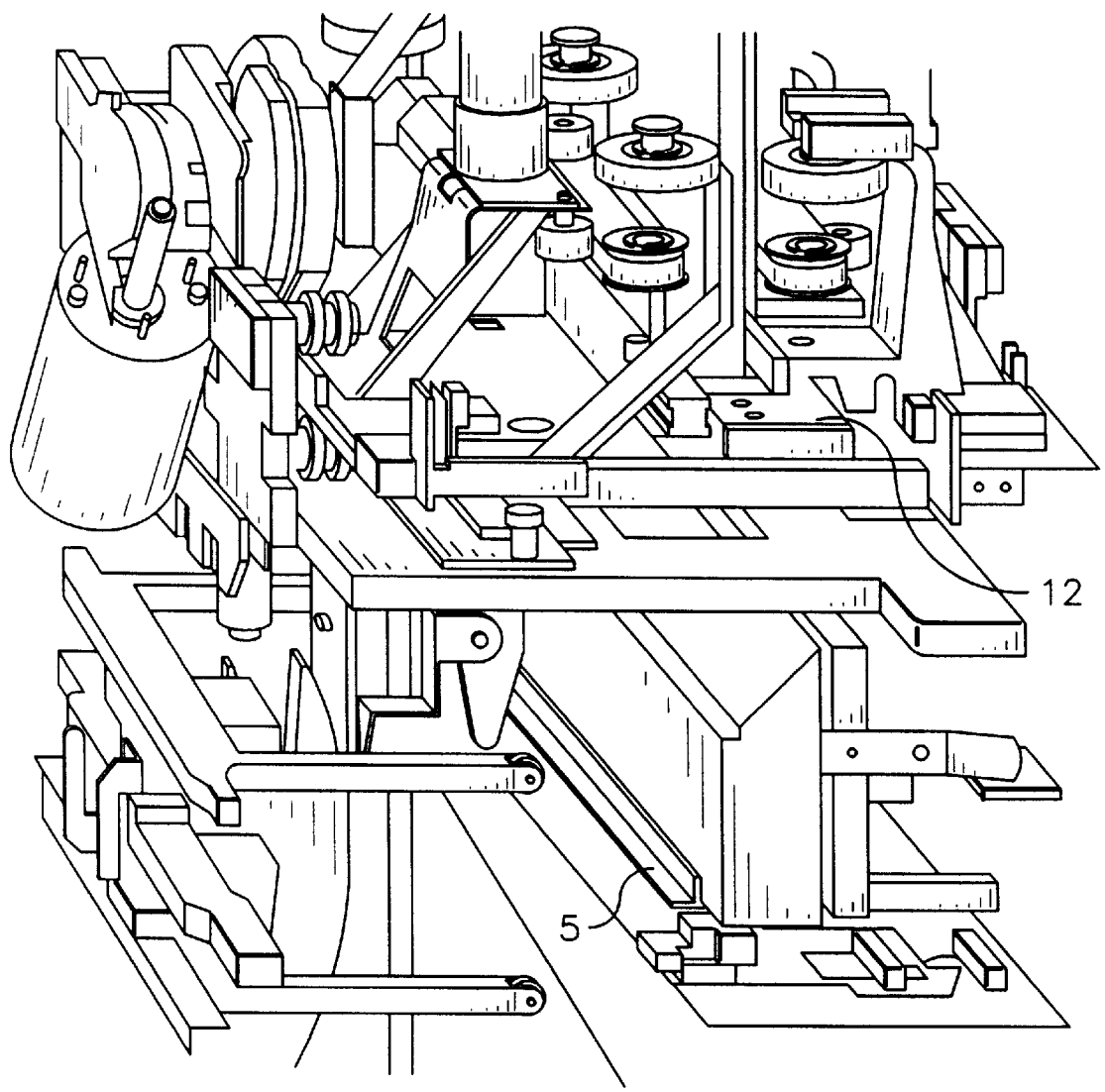
Figure 8:
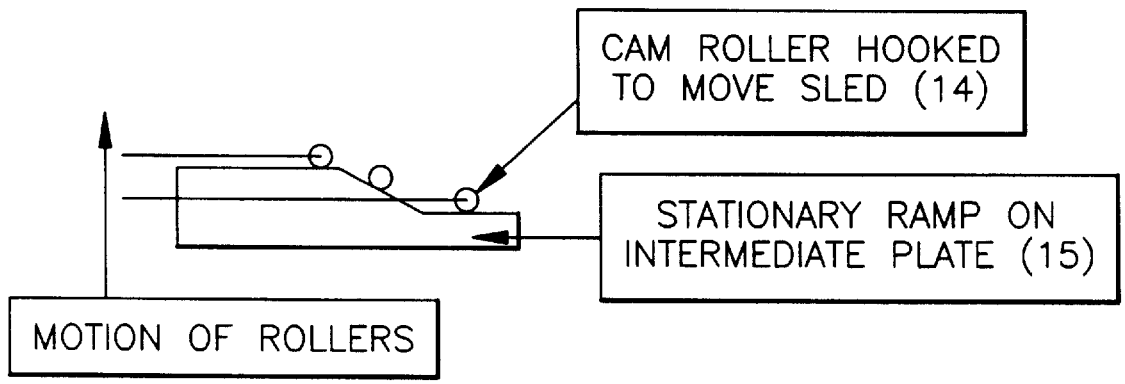

Referring now to FIGS. 1 and 7, there are shown perspective diagrammatic views of the present invention. The components shown are housed in an enclosed housing (not shown) and are only shown to the extent necessary to disclose the present invention. Many other components are not shown that are combined with the shown components to produce commercial computed radiography equipment.

As shown, a CR cassette, 60 including a five sided shell 11 and an image plate 16 cantilevered from cassette extrusion 7, is loaded vertically into CR reader 50. Cassette shell 11 is shown positioned at loading and unloading station 52. The CR cassette shell 11/image plate 16 can be of the type disclosed in U.S. Pat. No. 5,861,631, issued Jan. 19, 1999, inventors Wendlandt, et al., the contents of which are hereby incorporated by reference. As shown in FIG. 1 image plate 16 has been removed from cassette shell. Image plate 16 carries a storage phosphor which stores a latent radiographic image to be read out by reader 50.

Figure 5:
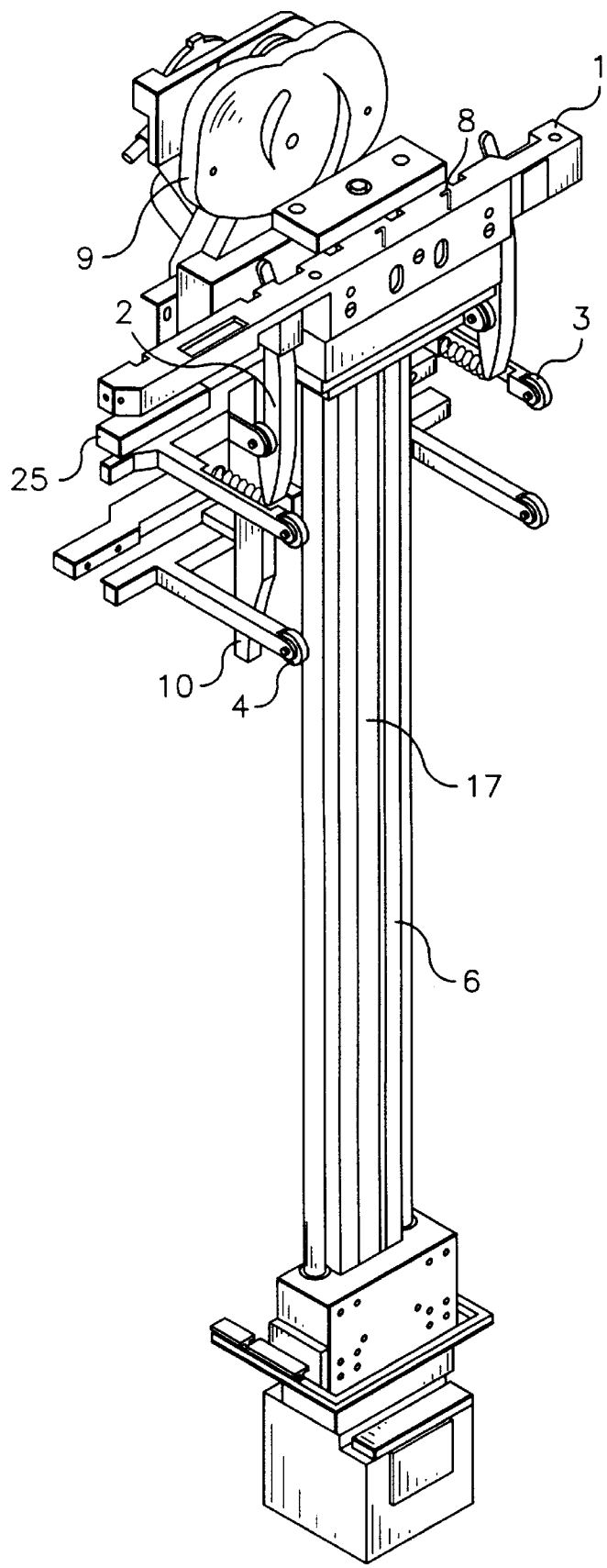
Figure 6:
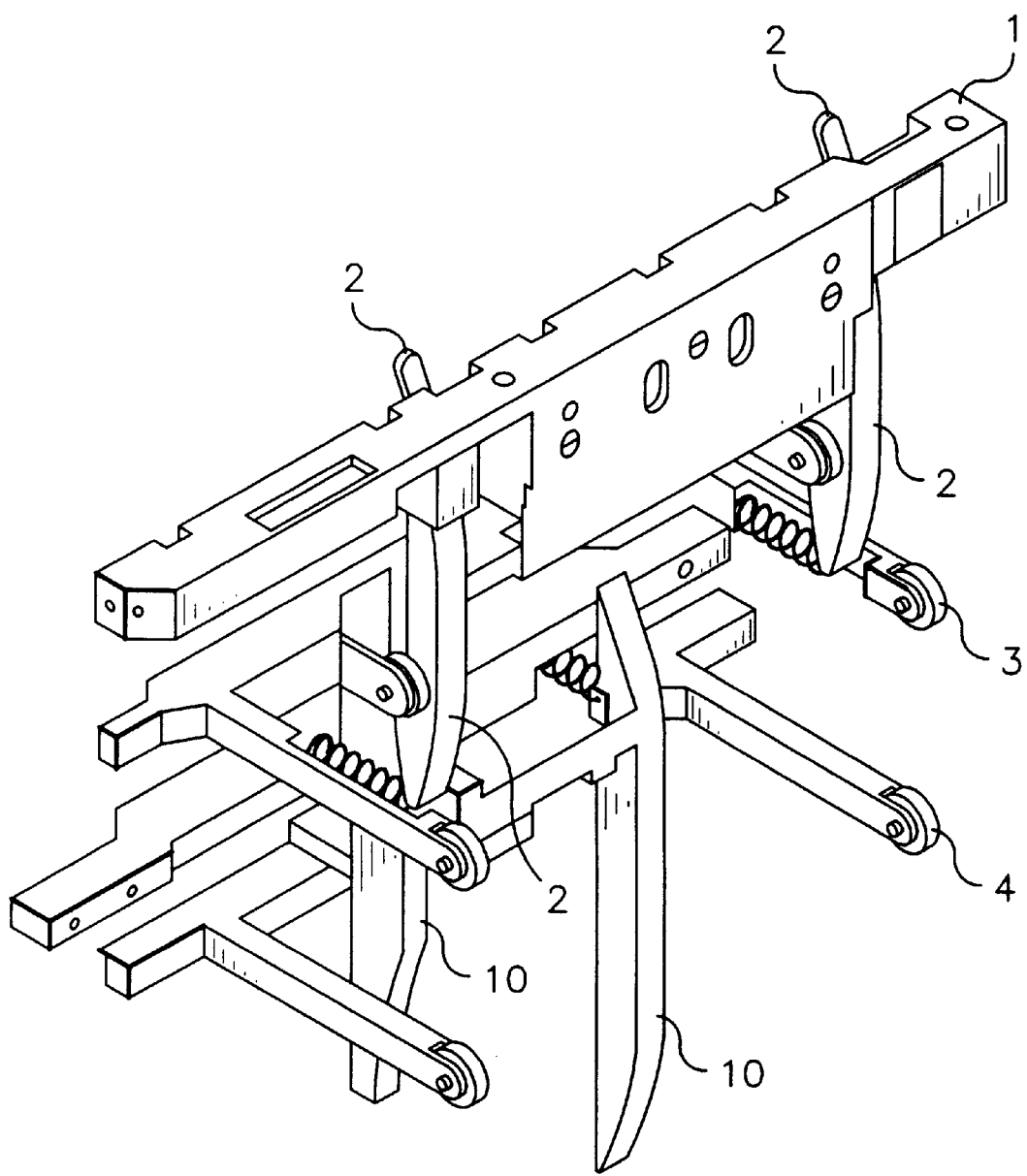

Reader 50 includes a cassette clamping and image plate unlatching assembly including cassette stop 13, clamp rollers 19, drive rollers 20, cassette drive motors 18 for driving rollers 20, light shutter mechanism 12, sled 14, cam 9, and intermediate plate 15. An extraction bar 1 engages lower cassette extrusion 7 to extract an image plate 16 from cassette shell 11 after it has been unlatched by hooks 8 (FIG. 5). A suitable cassette latching and unlatching mechanism is disclosed in U.S. Pat. No. 5,954,469, issued Sep. 21, 1999, inventors Ngo, et al., the contents of which are hereby incorporated by references.

An image plate handling assembly includes extraction bar 1, mounted for vertical movement on slide 6 and driven by screw and nut device 17, image plate guides 2, scan line rollers 3, erase line rollers 4, collector nose piece 5. Extrusion bar 1 includes a bar code scanner 25 (FIG. 5) for scanning a bar code on extrusion 7. The bar code can include plate dimensions, storage phosphor sensitometry, cassette ID number, etc.

Not shown are the laser scanning assembly and light collector located in the region of line scan rollers 3. These components are well known and can be of the type disclosed in U.S. Pat. No. 5,541,421, issued Jul. 30, 1996, inventors Brandt, et al.

An erase station 54 includes a bank of lights (not shown) for erasing any residual image in image plate 16 after it has been scanned.

Operation of these components of reader 50 are as follows with reference to FIGS. 1–8.

Vertical Scanning

The vertical scanning section consists of the cassette clamping device (FIG. 1) which is described in the following section, an extraction bar (1), a constant velocity slow scan motor (24),the plate guides (2), and the support rollers for the scan line (3), the movable collector nose piece (5), and the erase line rollers (4).

The roller clamping device which could also be a pneumatic clamp or a mechanical clamp, holds the cassette relative to the extraction bar (1) as it is being unlatched and scanned. It is described in detail below.

The extraction bar (1) and hooks (8) grip the lower cassette extrusion (7) which is attached to the image plate (16). The action of the CAM (9) unlatching mechanism unlatches the cassettes with the hooks (8) in the extraction bar (1) and locks the image plate (16) onto the bar. The surface of the extraction bar (1) is tilted at a slight angle to always tip the plate towards the plate guides (2) and the scan line rollers (3). The springs inside the extraction bar (1) are sized such that the plate is held against the bar with enough force to overcome bumps to the outside of the unit.

To begin the scanning process the slow scan motor (24) is actuated and the scan process begins. The slow scan nut has a preload which takes all back lash out of the system. This combination is critical so the extraction bar (1) does not "fall" suddenly causing banding on the image.

The extraction bar (1) pushes the plate guides (2) out of the path as the plate first exits the cassette. The guides then begin to support the plate after the extraction bar (1) passes. The plate guides (2) lift the plate slowly off the cassette shell (11) to eliminate the effect of rubbing surfaces inside the cassette during scanning. As the plate moves toward the scan line the collector nose piece (5) is actuated into place by a solenoid after the extraction bar (1) passes. The laser is then actuated and the scanning of the plate begins. As the extraction bar (1) continues down during scanning, linear cams (10) slowly bring the scan line rollers (3) into position. These rollers support the plate as it exits the cassette, and transitions off the plate guides (2). The purpose of the scan line rollers (3) is to support the plate at the scan line. The plate guides (2) could not do this because of the requirement for them to be close to the cassette entrance. It is critical to support the plate at the scan line to avoid large collector to plate changes in spacing due to plate flatness tolerances. After the scan is completed the erase line rollers (4) cam in to support the plate during erase. They are not critical and could be simple stationary skids to ensure the shorter plates do not bind on the scan line rollers (3) when the plate is returned to the cassette.

The cycle is reversed after the erase. The return speed of the extraction bar (1) is faster to reduce overall cycle time. The collector nose piece (5) is retracted, and the plate guides (2) act to ensure that the plate enters the cassette properly without binding.

All components are linked together on a central casting to allow tolerances between subsystems to be minimized. In order to properly hold the cassette shell (11), extract the image plate 16, and scan while removing the image plate 16 all of the subsystems must be located carefully relative to one another. The optical casting provides a frame structure that accomplishes this objective and minimizes tolerances.

This concept is unique in that by scanning as the plate is extracted from the cassette in the vertical orientation the overall system size is significantly reduced. This is very important to hospitals which need to conserve space in the exam room area.

CAM Unlatching Mechanism

The CAM (9) and unlatching mechanism performs all of the motions required to clamp the cassette, unlatch the cassette, light seal, and hold the plate to the extraction bar (1). The CAM (9) motion is accomplished by an inner and outer profile. The inner profile is a continuous slot engaged by a cam follower which moves the sled (14) forward and backward which clamps the cassette, actuates the light shutter mechanism (12), and unlatches the cassette. The outer peripheral profile operates the hooks (8) in the extraction bar (1) through a cam follower lineage. The operation is as follows:

A cassette is ready for loading in the direction of arrow 70. The CAM (9) is indexed to position #1. As the CAM (9) makes this move the sled (14) is moved forward over plate 15 paralleled to cassette 60 which causes the drive rollers (20) to move into position and "pinch" the cassette. Pinch is enough to drive the cassette 60 into position on the extraction bar. The drive rollers (20) are moved inward by a "ramp" located under the each roller so when the sled (14) moves ahead the drive roller (20) is indexed perpendicular to the sled (14) motion (FIG. 8) towards cassette 60. The cassette 60 is then driven into cassette stops (13) by the cassette drive rollers 20 driven by motors (18). Once reaching the cassette stops (13) the CAM (9) is indexed to position #2. As the CAM (9) moves to position #2 the outside profile through the cam follower linkage raises the hooks (8) first. Then the inside profile of CAM 9 through cam follower moves the sled (14) ahead to unlatch the cassette latch. During this move the clamping force is also increased on the cassette shell (11) as the drive rollers (20) finish the travel up the ramps and press the cassette shell (11) against the clamp rollers (19) Rollers 19 are made of a high durometer rubber or steel to locate the cassette shell (11). At the same time another "ramp" actuates a light shutter mechanism (12) to seal light around the back side of the cassette. The outside profile then lowers and releases the hooks (8). The lower cassette extrusion (7) holding the image plate (16) is now attached to the extraction bar (1).

The scan cycle is then performed.

After scanning the CAM (9) is indexed to position #3. As the CAM (9) moves to position #3 the outside profile raises the hooks (8) in the extraction bar (1), the inner profile moves the cassette sled (14) backwards to relatch the cassette and ease the clamping force on the shell. The outside profile then lowers the hooks (8) down below the surface of the extraction bar (1). The cassette drive rollers (20) push the cassette 60 out of the unit and then the CAM (9) is indexed back to the home position. As the CAM (10) moves to the home position the inside profile moves the cassette sled (14) back and removes the pinch from the cassette shell (11).

The invention has been described in detail with particular reference to certain preferred embodiments thereof, but it will be understood that variations and modifications can be effected within the spirit and scope of the invention.

PARTS LIST

| | |
|---|---|
| 1 | extraction bar |
| 2 | plate guide |
| 3 | scan line |
| 4 | erase line rollers |
| 5 | collector nose piece |
| 6 | slide |
| 7 | lower cassette extrusion |
| 8 | hooks |
| 9 | cam |
| 10 | linear cams |
| 11 | cassette shell |
| 12 | light shutter mechanism |
| 13 | cassette stops |
| 14 | sled |
| 15 | intermediate plate |
| 16 | image plate |
| 17 | screw and nut |
| 18 | cassette drive motors |
| 19 | clamp rollers |
| 20 | drive rollers |
| 23 | roller |
| 24 | slow scan motor |
| 25 | bar code scanner |
| 50 | CR reader |
| 52 | loading and unloading station |
| 100 | x-ray source |
| 102 | object of interest |
| 104 | CR image plate |
| 106 | CR reader |
| 108 | electronic radiographic image |

What is claimed is:

1. A computed radiography (CR) reader comprising:
  a cassette receiving station for receiving in a vertical orientation, a computed radiography cassette including a light tight cassette shell and an image plate supported by an extrusion closing off said shell, said image plate storing a latent radiographic image and being latched in said cassette shell;
  a first roller assembly located on one side of said cassette receiving station;
  a second roller assembly located on the other side of said cassette receiving station, cooperatively associated with said first roller assembly;
  means for mounting said second roller assembly for movement towards and away from said first roller assembly;
  an image plate unlatching and latching assembly; and
  a cam assembly operatively linked to said means for mounting said second roller assembly and to said unlatching and latching assembly, said cam assembly being operable in a first mode when a computed radiograhpy cassette is received in said cassette receiving station, to actuate said mounting means to move said second roller assembly towards said first roller assembly to clamp said cassette between said first and second roller assemblies and to actuate said unlatching and latching assembly to unlatch said image plate from said cassette shell;
  and in a second mode to actuate said unlatching and latching assembly to latch said image plate in said cassette shell and to actuate said mounting means to move said second roller assembly away from said first roller assembly to unclamp said cassette to allow removal of said cassette from said receiving station.

2. The computed radiography reader of claim 1 including a light shutter movable toward and away from a received cassette, wherein said in first mode, said cam assembly causes said light shutter to move into contact with said cassette shell and wherein in said second mode said cam assembly causes said light shutter to move out of contact with said cassette shell.

3. The computed radiography reader of claim 1 wherein said first and second roller assemblies are mounted on a sled which moves parallel to a received cassette and wherein said cam assembly includes a first cam surface and a first cam follower assembly mounted on said sled and engaging said surface and wherein movement of said first cam surface causes said cam follower to move said sled thus causing said mounting means to move said second roller assembly towards and away from said first roller assembly.

4. The computed radiography reader of claim 3 wherein said cam assembly includes a second cam surface and a second cam follower assembly for actuating said unlatching and latching assembly.

5. The computed radiography reader of claim 3 including a ramp assembly operatively coupled to said sled and said second roller assembly so that movement of said sled causes said second roller assembly to engage said ramp assembly to effect movement of said second roller assembly towards and away from said first roller assembly.

6. The computed radiography reader of claim 1 wherein said image plate latching and unlatching assembly includes an extraction bar having vertically moveable hooks and wherein said cam assembly actuates said hooks to unlatch and latch said image plate relative to said cassette shell.

7. The computed radiography reader of claim 4 wherein said image plate latching and unlatching assembly includes an extraction bar having vertically moveable hooks and wherein said second cam surface and said second clam follower assembly actuate said hooks to unlatch and latch said image plate relative to said cassette shell.

8. The computed radiography reader of claim 6 wherein said hooks lock said image plate to said extraction bar which is moved vertically to transport said image plate through image scanning and residual image erase operations.

9. The computed radiography reader of claim 7 wherein said hooks lock said image plate to said extraction bar which is moved vertically to transport to said image plate through image scanning and residual image erase operations.

* * * * *